United States Patent
Pathania

(10) Patent No.: US 12,058,613 B2
(45) Date of Patent: *Aug. 6, 2024

(54) NETWORK SLICE ASSIGNMENT CONTROL SYSTEMS AND METHODS

(71) Applicant: DISH Wireless L.L.C., Littleton, CO (US)

(72) Inventor: Amit Pathania, Herndon, VA (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,352

(22) Filed: May 12, 2023

(65) Prior Publication Data

US 2023/0284130 A1 Sep. 7, 2023

Related U.S. Application Data

(63) Continuation of application No. 17/362,051, filed on Jun. 29, 2021, now Pat. No. 11,690,004.

(51) Int. Cl.
| | |
|---|---|
| *H04W 48/18* | (2009.01) |
| *G06N 20/20* | (2019.01) |
| *H04W 48/16* | (2009.01) |

(52) U.S. Cl.
CPC ............ *H04W 48/18* (2013.01); *G06N 20/20* (2019.01); *H04W 48/16* (2013.01)

(58) Field of Classification Search
CPC ....... H04W 48/18; H04W 48/16; G06N 20/20
See application file for complete search history.

(56) References Cited

U.S. PATENT DOCUMENTS

| | | | |
|---|---|---|---|
| 11,284,288 B2 | 3/2022 | Yavuz | |
| 11,690,004 B2 * | 6/2023 | Pathania | H04W 48/16 370/329 |
| 2018/0367997 A1 | 12/2018 | Shaw | |
| 2019/0123963 A1 | 4/2019 | Tang | |
| 2020/0145833 A1 * | 5/2020 | Thakolsri | H04W 24/02 |
| 2020/0178167 A1 * | 6/2020 | Jia | H04W 76/11 |
| 2021/0084582 A1 * | 3/2021 | Li | H04W 24/02 |
| 2022/0408334 A1 * | 12/2022 | Mehta | H04W 36/36 |
| 2022/0408394 A1 * | 12/2022 | Paczkowski | H04M 15/81 |
| 2023/0029004 A1 * | 1/2023 | Gao | H04W 48/12 |

* cited by examiner

*Primary Examiner* — Julio R Perez

(74) *Attorney, Agent, or Firm* — Kilpatrick Townsend & Stockton LLP

(57) ABSTRACT

Various network slice assignment arrangements are presented. A network slice management system can create a multi-dimensional attribute matrix that defines network slices that operate on a physical cellular network. Using a machine learning algorithm, network slices that operate on the physical cellular network can be clustered based on attributes to create slice classes. A classification process to determine a slice class that most closely matches a cellular network service request may be performed. A network slice can then be selected from the slice class and be used for providing cellular network service.

20 Claims, 5 Drawing Sheets

| Slice Identifier | Geographic Regions | UL BW per UE | Total UL Bandwidth | DL Bandwidth per UE | Total DL Bandwidth | Jitter |
|---|---|---|---|---|---|---|
| 423089534 | 4584, 5501, 4485 | 5000 | 100000 | 150000 | 4000000 | 30 ms |
| 823948339 | 4584, 5501, 4485 | 5000 | 200000 | 8000 | 300000 | 30 ms |
| 823948339 | 4584, 5501, 4485 | 10000 | 300000 | 10000 | 300000 | 15 ms |
| 324843490 | 3405 | 3000 | 50000 | 3000 | 50000 | 10 ms |
| 427198139 | 4584, 5501, 4485 | 250 | 10000 | 1000 | 10000 | 20 ms |
| 340659944 | 4394, 0092 | 1000 | 50000 | 1000 | 50000 | 15 ms |
| 693948339 | 5484, 4584, 2405 | 560 | 2500 | 560 | 2500 | 18 ms |
| 230443994 | 4394, 0092 | 20 | 1000 | 600 | 10000 | 50 ms |
| 349349024 | 5484, 4584, 2405 | 20000 | 200000 | 20000 | 200000 | 30 ms |

NETWORK SLICE ASSIGNMENT CONTROL SYSTEMS AND METHODS

CROSS REFERENCE TO RELATED APPLICATIONS

This application is a continuation of U.S. Non-Provisional patent application Ser. No. 17/362,051, filed on Jun. 29, 2021, which is incorporated by reference for all purposes.

BACKGROUND

Advanced cellular networks, such as 5G New Radio (NR)-based cellular networks, can operate multiple slices. Clients of a particular cellular network may desire to execute various applications that have varying service level agreement (SLA) requirements. To meet such SLA requirements, different slices may be configured and user equipment (UE) of the client may be assigned to use a specific slice that meets the SLA requirements of the client's service or a particular application. As the number of services and applications requiring various SLA requirements, quality of service (QoS) parameters and number of slices increase, the ability to effectively assign UE to an appropriate slice may become increasingly difficult and inefficient, thus resulting in the uneven loading of network slices and providing clients with suboptimal performance.

SUMMARY

Various embodiments are described related to a method for network slice assignment. In some embodiments, a method for network slice assignment is described. The method may comprise creating, by a network slice management system, a multi-dimensional attribute matrix that may define a plurality of network slices that may operate on a physical cellular network. For each network slice of the plurality of network slices, a plurality of network slice attributes may be defined. The method may comprise clustering, by the network slice management system, using a machine learning algorithm, the plurality of network slices that may operate on the physical cellular network based on the plurality of network slice attributes to create a plurality of cellular network classes. The method may comprise receiving, by the network slice management system, a cellular network service request for an application of a client. The cellular network service request may define a plurality of requested network slice attributes. The method may comprise performing, by the network slice management system, a classification process to determine a cellular network class of the plurality of cellular network classes that may most closely match the plurality of requested network slice attributes of the cellular network service request. The method may comprise performing, by the network slice management system, a threshold-based analysis on network slices within only the determined cellular network class based on the classification process. The method may comprise selecting a network slice from the network slices of the cellular network class based on the threshold-based analysis. The method may comprise providing, by the physical cellular network, cellular network service to a plurality of user equipment for the application of the client using the selected network slice on the physical cellular network.

Embodiments of such a method may include one or more of the following features: performing the classification process may comprise calculating a multi-dimensional distance between the cellular network service request and each of the plurality of cellular network classes, or a distribution of similar cellular network classes. A parameter of the plurality of requested network slice attributes may be selected from the group consisting of: downlink bandwidth per UE; uplink bandwidth per UE; and a defined latency range for specific end-points. The method may further comprise filtering, by the network slice management system, the determined cellular network class to include only network slices available in a geographic region indicated by the cellular network service request. The threshold-based analysis may be performed on only the network slices available in the geographic region indicated by the cellular network service request. The machine learning algorithm used to perform clustering may be selected from the group consisting of: a neural network clustering algorithm; a K-means clustering algorithm; a DBSCAN algorithm; and an AHC algorithm. Performing the threshold-based analysis on the network slices within only the determined cellular network class may comprise sorting the network slices based on cost. The threshold-based analysis performed on the network slices within only the determined cellular network class may comprise determining network slices that have at least a threshold difference between revenue and cost. The threshold-based analysis performed on the network slices within only the determined cellular network class may comprise sorting the network slices based on utilization. Clustering, using the machine learning algorithm, the plurality of network slices that operate on the physical cellular network may be based on modifiable clustering parameters that controls a number of clusters identified. The network slice management system may manage network slices on a 5G New Radio (NR) cellular network.

In some embodiments, a network slice management system is described. The system may comprise a cellular network. The system may comprise a slice management system. The slice management system may comprise a multi-dimensional attribute matrix. The slice management system may comprise a slice class database. The slice management system may comprise one or more processors. The network slice management system may comprise a memory communicatively coupled with and readable by the one or more processors and having stored therein processor-readable instructions which, when executed by the one or more processors, may cause the one or more processors to: create the multi-dimensional attribute matrix that defines a plurality of network slices that operate on a physical cellular network. For each network slice of the plurality of network slices, a plurality of network slice attributes may be defined. They system may cause the one or more processors to cluster, using a machine learning algorithm, the plurality of network slices that operate on the physical cellular network based on the plurality of network slice attributes to create a plurality of cellular network classes that are stored in the slice class database. The system may cause the one or more processors to receive a cellular network service request for an application of a client. The cellular network service request may define a plurality of requested network slice attributes. The system may cause the one or more processors to perform a classification process to determine a cellular network class of the plurality of cellular network classes that may most closely match the plurality of requested network slice attributes of the cellular network service request. The system may cause the one or more processors to perform a threshold-based analysis on network slices within only the determined cellular network class based on the classification process. The system may cause the one or more processors to select a network slice from the network slices of the cellular network class based on the threshold-based analysis. The system may cause the one or more processors to provide cellular network service using the cellular network to a plurality of user equipment for the application of the client using the selected network slice on the cellular network.

Embodiments of such a system may include one or more of the following features: the one or more processors being configured to perform the classification process may comprise the one or more processors being configured to calculate a multi-dimensional distance between the cellular network service request and each of the plurality of cellular network classes, or a distribution of similar cellular network classes. A parameter of the plurality of requested network slice attributes may be selected from the group consisting of: downlink bandwidth per UE; uplink bandwidth per UE; and a defined latency range for specific end-points. The one or more processors may be further configured to filter the determined cellular network class to include only network slices available in a geographic region indicated by the cellular network service request. The threshold-based analysis may be performed on only the network slices available in the geographic region indicated by the cellular network service request. The machine learning algorithm used to perform clustering may be selected from the group consisting of: a neural network clustering algorithm; a K-means clustering algorithm; a DBSCAN algorithm; and an AHC algorithm. The one or more processors being configured to perform the threshold-based analysis on the network slices within only the determined cellular network class comprises the one or more processors being configured to sort the network slices based on cost. The threshold-based analysis performed by the one or more processors on the network slices within only the determined cellular network class may comprise the one or more processors being configured to determine network slices that have at least a threshold difference between revenue and cost. The threshold-based analysis performed by the one or more processors on the network slices within only the determined cellular network class may comprise the one or more processors being configured to sort the network slices based on utilization. The one or more processors being configured to cluster, using the machine learning algorithm, the plurality of network slices that operate on the physical cellular network may be performed based on modifiable clustering parameters that controls a number of clusters identified. The cellular network may be a 5G New Radio (NR) cellular network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 illustrates an excerpt of an attribute matrix of an automated slice assignment control system.

DETAILED DESCRIPTION

Figure 1:
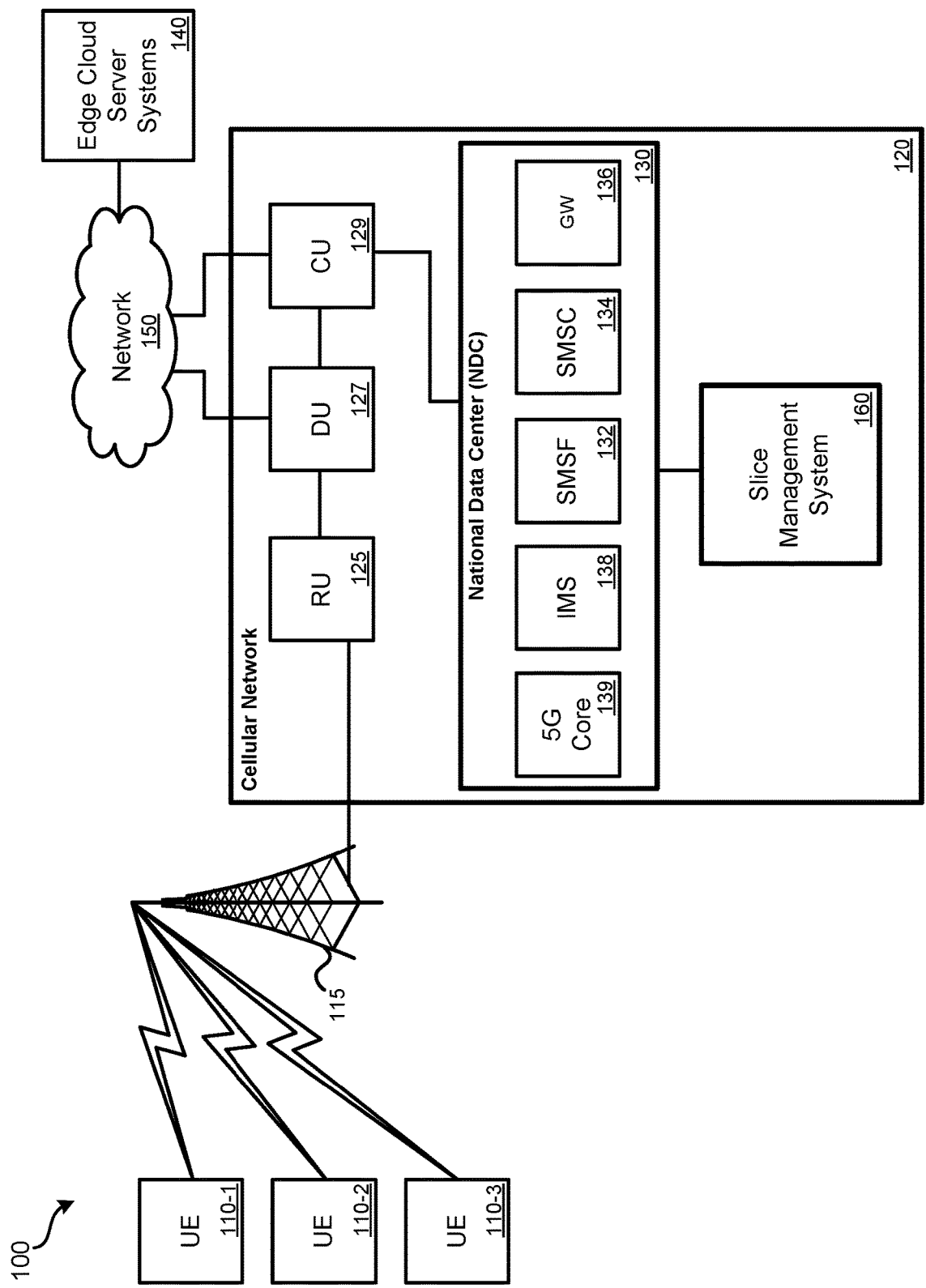
FIG. 1 illustrates an embodiment of a cellular network having an incorporated automated slice assignment control system.

Cellular network slicing, such as 5G cellular network slicing, is an architecture that allows virtual independent networks to be present on a same physical network infrastructure. Various slices may be allocated differing resources that allow network slices to serve specific needs and applications. For example, a first client may desire a network slice that delivers certain SLA that enable reliable HD video streaming for UE associated with the first client. A second client may desire a network slice that provides ultra-low latency communication between a cloud-based server system and UE associated with the second client, while also providing a video communication component to the second client. A single underlying physical network can have at least two (and, likely, many more) independent network slices operating on it, allowing each client to realize SLA attributes needed for their particular one or more applications.

As the number of clients that use a particular cellular network grows and the requested services diversify, the number of network slices that are defined and implemented on a single underlying physical cellular network may become large. For instance, thousands of network slices may be present on a single underlying physical cellular network. A particular client (e.g., an entity, such as a company, that operates some number of UE for a particular application) may have a dedicated network slice or may operate UE on a shared network slice that is sufficient to realize the SLA attributes needed by the client for one or more applications used or provided by the client. As a first example, a first client may be a gaming company that offers cloud-based gaming services through a 5G NR cellular network. The first client may require that the cellular network meet a first set of SLA attributes for all of its devices used by its customers to ensure a reliable and enjoyable gaming experience. A second client may be a video streaming company that offers streaming video services through the 5G NR cellular network. The second client may require that the cellular network meet a second set of SLA attributes for all of its applications used by its customers to ensure a reliable and enjoyable gaming experience. Each of these clients need to be placed on a network slice that is sufficient for their individual needs.

If a large number of network slices are present, it may not be efficient for a cellular network administrator to identify an existing network slice (or the need for a new network slice) based on many dimensions of SLA attributes requested by a client or determine whether a new network slice needs to be defined. On one hand, an administrator may select a network slice that comfortably exceeds the SLA attributes needed by the client, thus sub-optimally allocating physical cellular network resources. On the other hand, the administrator may select a network slice that does not meet one or more SLA attributes needed by the client, thus failing to provide the level of service requested by the client.

Embodiments detailed herein are focused on analyzing many dimensions of SLA attributes requested by a client and determining whether an existing network slice is appropriate to meet the client's SLA without sub-optimally allocating cellular network resources. Embodiments can be further focused on determining whether based on the QoS parameters requested by the client, a new network slice should be defined in one or more geographic regions.

Further details of such embodiments and alternative embodiments are detailed in relation to the figures. FIG. 1 illustrates an embodiment of a cellular network system 200 ("system 200") having an incorporated network slice assignment control system. System 100 can include: UE 110 (UE 110-1, UE 110-2, UE 110-3); base station 115; cellular network 120; radio unit 125 ("RU 125"); distributed unit 127 ("DU 127"); centralized unit 129 ("CU 129"); national data center 130 ("NDC 130"); one or more edge cloud server systems 140; network 150; and slice management system 160.

UE 110 can represent various types of end-user devices, such as smartphones, cellular modems, cellular-enabled computerized devices, sensor devices, gaming devices, access points (APs), any computerized device capable of communicating via a cellular network, etc. UE 110 may be able to access various applications, which may be executed at least in part remotely. For example, a cloud-based application may be executed, at least in part, at edge cloud server system 140. The application may be accessible via a web-based interface or a dedicated application executed by UE 110. Configuration and control of the cloud-based application may be managed by an administrator, such as via user administration system 170.

Depending on the location of individual UEs, UE 110 may use various cells to the base station of cellular network 120 to communicate with edge cloud server systems 140. As illustrated, a single base station 115 ("BS 115") is illustrated. Real-world implementations of system 100 can include many (e.g., thousands) of base stations. BS 115 can include one or more antennas that allow RU 125 to communicate wirelessly with UE 110. RU 125 can represent an edge of cellular network 120 where data is transitioned to wireless communication. The radio access technology (RAT) used by RU 125 may be 5G New Radio (NR), 4G Long Term Evolution (LTE), or some other RAT. The remainder of cellular network 120 may be based on an exclusive 5G architecture, a hybrid 4G/5G architecture, a 4G architecture, or some other cellular network architecture. The cellular network may utilize an Open Radio Access Network (O-RAN) architecture that emphasizes interoperability and standardization of RAN components.

One or more RUs, such as RU 125, may communicate with DU 127. One or more DUs, such as DU 127, may communicate with CU 129. CU 129 can communicate with NDC 130. The specific architecture of cellular network 120 can vary by embodiment. Edge cloud server systems 140 may communicate, either directly, via the Internet, or via some other network, with components of cellular network 120. For example, DU 127 may be able to communicate with edge cloud server system 140 without routing data through CU 129 or NDC 130. Other DUs may or may not have this capability. Similarly, none, some or all, CUs may have the ability to communicate with edge cloud server systems 140 without routing communications through NDC 130. Whether and which cellular components can communicate with edge cloud server systems 140 can vary by embodiment.

Network 150, which edge cloud server systems 140 may use to communicate with DU 127, CU 129, and/or NDC 130, can include one or more public and/or private networks. Network 150 can include the Internet. Network 150 can also include a private network that includes network connections between various components of cellular network 120 and private server systems.

NDC 130 can perform the functions of short message service function (SMSF) 132; short message service center (SMSC) 134; Internet Protocol-Short Message-Gateway (IP-SM-GW); short message service gateway (SMS-GW) 136 (hereinafter "GW 136"); IP Multimedia Subsystem (IMS) 138; and 5G Core 139. SMSF 132 may perform functions including analyzing a subscription or permissions associated with the source and/or the destination of an SMS text. SMSF 132 may only permit the SMS to be completed if in accordance with the subscription or permissions allocated to the transmitting and/or receiving UE. SMSF 132 may serve to forward permitted SMS messages to SMSC 134. GW 136 may facilitate SMS transmissions between cellular network providers and with other forms of networks (e.g., transmission of an SMS message from a computer system that uses the Internet to communicate with GW 136). SMSC 134 may serve to store, forward, convert, and deliver SMS messages for the cellular network. IMS 138 allows for SMS messages to be delivered via IP. IMS 138 routes SMS messages through the user plane and uses IMS to send the SMS to SMSC 134. Regardless of whether an SMS is routed via IMS 138 or via the control plane and SMSF 132, the embodiments presented in this document are applicable.

5G Core 139 can perform a variety of functions. 5G Core 139 can include:
authentication server function (AUSF); core access and mobility management function (AMF); data network (DN) which can provide access to various other networks; structured data storage network function (SDSF); and unstructured data storage network function (UDSF). While FIG. 1 illustrates various components of NDC 130 and cellular network 120, it should be understood that other embodiments of cellular network 120 can vary the arrangement and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and NDC 130.

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125, DU 127 and/or CU 129, a second set of network slices, which may only partially overlap or may be wholly different than the first set, may be reserved at other RUs, DUs, and/or CUs.

Further, particular cellular networks slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Slice management system 160 can function as a component of cellular network 120 or can be external to cellular network 120 and be in communication with components, such as NDC 130, of cellular network 120. Slice management system 160 may handle assignment of a service request to one or more network slices and, possibly, creation of a network slice, in response to a service request. Further detail regarding slice management system 160 is provided in relation to FIG. 2.

Figure 2:
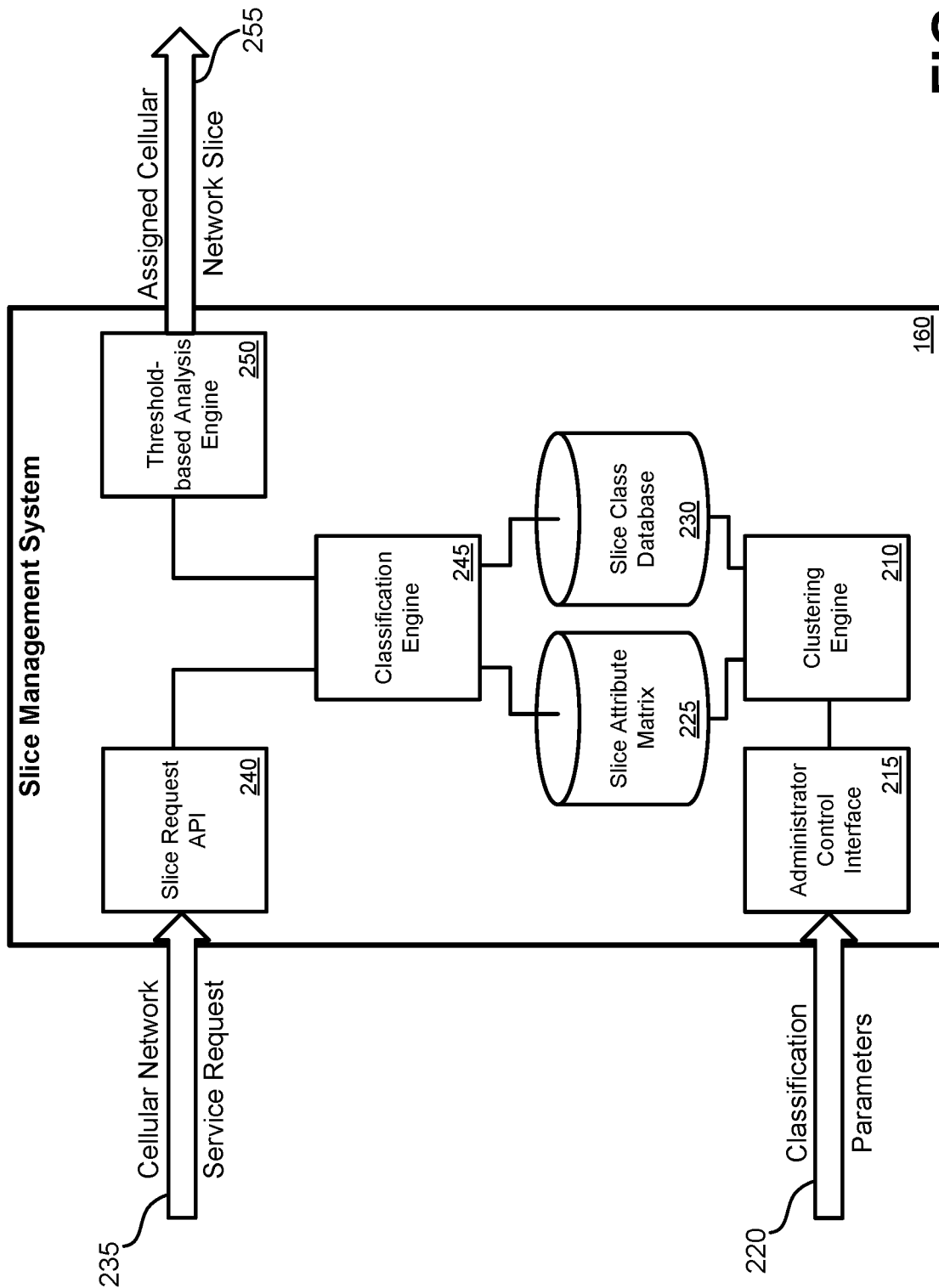
FIG. 2 illustrates an embodiment of an automated slice assignment control system.

FIG. 2 illustrates an embodiment of a slice management system 160 ("system 160"). System 160 can include: clustering engine 210; administrator control interface 215; slice attribute matrix 225; slice class database 230; slice request API 240; classification engine 245; and threshold-based analysis engine 250. System 160 may include one or more special-purpose or general-purpose processors that perform the functions of its various components. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Further, such data storage arrangements may be used to store data, such as slice attribute matrix 225 and slice class database 230.

Slice attribute matrix 225 can represent data storage arrangement in which configuration and operational parameters of network slices used on a physical cellular network, such as cellular network 120, are stored. A given network slice may have a single entry within slice attribute matrix 225 that defines various parameters or attributes of the network slice. For example, the number of attributes may be significant, such as dozens or hundreds of attributes. Each network slice entry may also include parameters or attributes of layers within each network slice. FIG. 3 illustrates a small number of possible parameters and a small number of network slices that may be indicated is slice attribute matrix 225. In a real-world implementation, there may be hundreds, or thousands of network slice entries present in slice attribute matrix 225 and, possibly, a large number of parameters or attributes for each network slice. Therefore, either manually searching through the network slices or searching the network slices in a conventional manner for particular parameters may be difficult.

Cluster engine 210 may perform a clustering process on the network slice entries of slice attribute matrix 225. Various machine learning algorithms can create some number of clusters of network slices. These clusters can take into account all or some of the attributes or parameters of each network slice defined in slice attribute matrix 225. Specifically, the type of machine learning algorithms that may be used to perform clustering by clustering engine 210 can include: a k-means clustering algorithm; an artificial neural network (ANN) algorithm; a mean-shift clustering algorithm; a density based spatial clustering of applications with noise (DBSCAN) algorithm; an Expectation-Maximization (EM) Clustering using Gaussian Mixture Models (GMM) algorithm; or an agglomerative hierarchical clustering (AHC) algorithm. The clusters may be created using unsupervised learning.

In some embodiments, an administrator may be able to provide various classification parameters 220 to clustering engine 210. For example, an administrator may define a distance variable that is used to define how close (across some or all of the dimensions) a network slice is to be to a neighbor to be considered part of a same gesture. The distance may be calculated as a Euclidean distance across the various dimensions (which can greatly exceed three dimensions) or as a Mahanalobis distance across various distributions across the various dimensions. Other possible types of distance measurements besides Euclidean or Mahanalobis are possible. In addition to distance, various other characteristics are present for clusters, such as intra-cluster cohesion (which can be referred to as compactness) and inter-cluster separation (which can be referred to as isolation. Various parameters of machine learning algorithms can be defined by an administrator via classification parameters 220 that will affect the number and definition of clusters of network slices.

Clustering engine 210 can output definitions of clusters, referred to as slice classes, to slice class database 230. Therefore, slice class database 230 may have an entry indicative of each class (or cluster) created by clustering engine 210. In some embodiments, clustering engine 210 may execute multiple different machines learning based clustering algorithms and/or a same machine learning based clustering algorithm with different parameters and slice class database 230 may store indications of these different slice classes. For example, each slice class may be defined by a median set of parameters for slices that were grouped within that particular slice class. Therefore, a single slice class entry within slice class database 230 may represent a large number of network slices from slice attribute matrix 225 that were clustered together.

A client or potential client may submit a cellular network service request 235 to slice management system 160. Cellular network service request 235 may define various desired attributes or parameters of a network slice desired by the client. A client may be any entity that operates or provides one or more services on one or more UE. For example, a client may be a gaming company that provides cloud-based gaming services via a cellular network to gaming devices in one or more geographic regions. As another example, a client may be a company that operates a number of sensor devices that report data via a cellular network. Cellular network service request 235 may indicate desired values of some or all of parameters that are stored for slice attribute matrix 225. Cellular network service request 235 may be received via slice request API 240. In other embodiments, some other form of client facing portal may be used to receive cellular network service request 235—for example, a client may access a webpage into which desired network slice parameters may be entered.

Parameters of cellular network service request 235 may be passed by slice request API 240 to classification engine 245. Classification engine 245 can perform a search of slice class database 230 to determine a particular network slice class that most closely corresponds to cellular network service request 235 for its various attributes. Classification engine 245 may be able to perform a search of slice class database 230 significantly quicker than if a search of slice attribute matrix 225 was directly performed due to the number of entries and dimensions. If multiple machine learning algorithms were used by clustering engine 210, multiple possible slice classes may be obtained by classification engine 245 from slice class database 230.

If no slice class is within a threshold distance of cellular network service request 235, classification engine 245 may return an indication that no suitable network slice or slice class currently exists. Otherwise, classification engine 245 may obtain data for the network slices that correspond to the one or more identified slice classes from slice attribute matrix 225 and pass to threshold-based analysis engine 250.

Threshold-based analysis engine 250 performs a more individualized analysis using particular parameter thresholds to identify one or a ranking of multiple network slices from slice attribute matrix 225 that are appropriate for hosting the services requested in cellular network service request 235. For example, for particular parameters indicated in cellular network service request 235 a threshold may be set as far as how different the parameter is permitted to be different (greater or less than) on the network slice used to satisfy cellular network service request 235. For each parameter in cellular network service request 235, a different threshold may be set for how much the parameter can be exceeded and/or falls short. While from a client's point-of-view, greatly exceeding a requested parameter may be acceptable, the cellular network provider may not desire to devote physical network resources to providing an unneeded service.

Threshold-based analysis engine 250 may also perform a geographic-based filtering function. Geographic-based filtering may, in some embodiments, be performed similar to any other attribute present in slice attribute matrix 225. Alternatively, network slices that are not available in a geography requested in cellular network service request 235 may be eliminated from consideration, or a new slice may be temporarily created in the particular geography to act as control group for analysis.

If multiple network slices meet the threshold-based analysis performed by threshold-based analysis engine 250, a ranking of the network slices may be created. The ranking may be based on which network slice will provide the best overall performance that meets cellular network service request 235. In some embodiments, a cost-based analysis may be performed. The network slices may be recommended based on a cost to the client to use each network slice. For instance, two network slices may meet all of the parameters of cellular network service request 235. However, one may be associated with a significantly higher cost. Therefore, the lower cost network slice may be used or offered to the client.

In other embodiments, the ranking may be based on a comparison of expected revenue against cost. Cost may be indicative of what it costs the cellular network provider to provide the network slice to the client. The revenue can be indicative of the amount of money expected to be received from the client for satisfying cellular network service request 235. The cellular network service provider that operates slice management system 160 may rank the available network slices from most profitable to least.

In still other embodiments, the ranking may be wholly or partially dependent on utilization of each network slice. Relatively less utilized network slices may be ranked higher than relatively more utilized network slices. Therefore, the cellular network service provider may favor more evenly distributing utilization across network slices. In still other embodiments, the ranking may take into account multiple of these factors, possibly in a weighted fashion.

In some embodiments, slice management system 160 may assign the best network slice 255 using the factors above and assign UE of the client to use the network slice for future use of the desired application. In other embodiments, a list or ranking of the network slices that meet some or all of the parameters of cellular network service request 235 may be output and provided to the client for selection. Additionally, or alternatively, if no existing network slice is a close match to cellular network service request 235, a customized network slice may be created. This new cellular network slice may only be eligible for use by the client or may be defined such that excess capacity is present such that one or more other clients in the future may be assigned to the network slice. If a network slice is recommended or assigned, and one or more of the network slice parameters is insufficient for cellular network service request 235, parameters of the network slice may be modified such that the network slices' parameters are sufficient. As an example, the cellular network service provider may find it most efficient to adjust one or more parameters of an existing network slice that are otherwise sufficient, rather than assigning another network slice that greatly exceeds parameters of cellular network service request 235 or creating a new network slice.

FIG. 3 illustrates an excerpt 300 of slice attribute matrix 225 of a network slice assignment control system. As illustrated, nine network slices have entries within slice attribute matrix 225. In a real world implementation, hundreds or even thousands of network slices may have entries within slice attribute matrix 225. For each network slice, many characteristics or parameters may be defined, such as: downlink/uplink throughput (aggregate for network slice); downlink/uplink throughput (per UE); maximum downlink/uplink throughput; maximum supported packet size; mission critical level (e.g., compared to other network slices); radio spectrum; packet error rate; supported access technologies; supported device velocity for a defined QoS; uplink throughput (aggregate for network slice); maximum uplink throughput; and/or synchronicity. Other parameters for a slice may also be defined, such as: a defined latency range for specific end-points; reserved or shared spectrum; one or more particular security profiles; optimization for specific applications or sets of applications (e.g., healthcare applications, industrial applications); optimization for high-speed mobility; and varying degrees of customer-side control of network parameters. Other parameters may also be defined, such as parameters for individual layers within each network slice.

Some or all attributes within slice attribute matrix 225 may be treated as a dimension used for clustering. In some embodiments, particular attributes may be excluded from use for clustering, such as geographic region, utilization, and/or cost.

Figure 4:
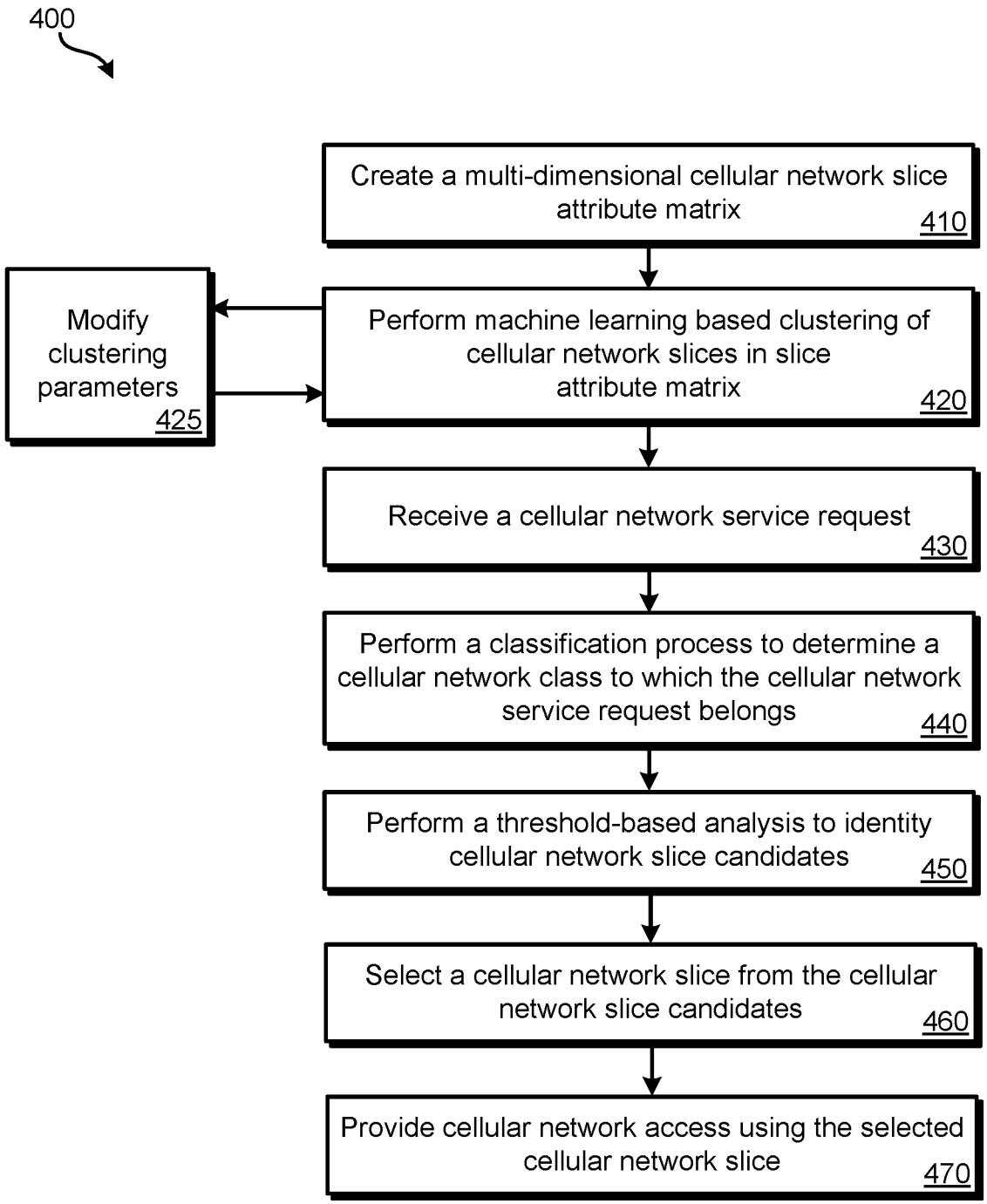
FIG. 4 illustrates an embodiment of a method for slice assignment.

Various methods may be performed using the systems and arrangements detailed in relation to FIGS. 1-3. FIG. 4 illustrates an embodiment of a method 400 for network slice assignment. Method 400 may be performed using system 100 of FIG. 1. More specifically, each block of method 400 can be performed using slice management system 160 of FIG. 2. Method 400 can also be performed using some other form of slice management system that may function as part of, or in communication with, a cellular network. The cellular network may be a 5G core network that allows for cellular network slicing. Other forms of cellular network that allow for cellular network slicing may also be possible.

At block 410, a multi-dimensional network slice attribute matrix may be created or updated. The multi-dimensional matrix may include entries for some or all of the network slices being executed on an underlying physical cellular network. Some or all parameters of each network slice may be indicated in the matrix, such as exemplified in FIG. 3, as attributes of the network slice. The matrix may include both a large number of attributes (e.g., hundreds of attributes per slice) and a large number of slices (e.g., hundreds or thousands of slices).

At block 420, a machine learning based clustering of the network slices in the slice attribute matrix may be performed. The clustering may be performed using multiple clustering algorithms and/or a particular clustering algorithm with varying parameters (as modified at block 425). A result may be one or more sets of network slice clusters, referred to as network slice classes. Further detail regarding the clustering is detailed in relation to clustering engine 210 of FIG. 2. The defined network slice classes may be stored following creation. As network slices are modified, added, and removed, the clustering process may be periodically or occasionally updated to remain up-to-date.

At block 430, a cellular network service request for a network slice may be received. The cellular network service request can indicate QoS levels or parameters that a client desires to be met for a specific group of UE, possibly in combination with the use of one or more particular applications. For example, a network slice may be desired for when the group of UE are only using a particular application. As an example, a gaming provider may desire a network slice for use by its customers only when the customers are using its gaming application. The cellular network service request may indicate some number of attributes, which may include a geographic indication, and a definition of the group of UE and/or the application for which the network slice is desired.

At block 440, a classification process may be performed to determine a cellular network class, from block 420, that is a best match for the cellular network service request. A distance (e.g., Euclidian distance) between the attributes or parameters of the cellular network service request and each cellular network class may be calculated to determine which cellular network class is most similar to the parameters or attributes requested in the cellular network service request. If the cellular network classes were created using varying clustering parameters and/or varying machine learning algorithms, each of the created classes by the varying algorithms or varying cluster parameters may be evaluated to determine the closest slice class.

At block 450, a threshold-based analysis may be performed only on network slices that are within the network slice class identified as closest at block 440. Network slices that are part of a different slice class may be ignored. By only analyzing network slices within the closest slice class, analysis may be able to be performed much faster than if all network slices available on the cellular network were evaluated. In some embodiments, network slices with above a certain percentage of utilization may be excluded from analysis. In some embodiments, location of where a network slice may be treated as a special parameter—if a network slice is not available in the geographic region indicated in the cellular network service request, the network slice may be excluded from analysis.

The threshold-based analysis of block 450 may involve setting upper and/or lower bounds on particular characteristics or parameters of the cellular network service request to determine which network slices within the class determined at block 440 are the closest match. In some embodiment, a ranking, as previously detailed, is created. At block 460, a single network slice may be selected based on the analysis of block 450 or the ultimate selection of the network slice may be performed by a cellular network administrator or the client.

At block 470, service may be provided to one or more UE of the client on the selected network slice of block 460. Cellular network service may be provided on the selected network slice for all cellular network traffic for the UE or only for one or more specific applications.

While method 400 is focused on selecting a pre-existing network slice to meet the requirements of the cellular network service request, it is possible that a network slice may be modified in one or more ways to better match the cellular network service request. For example, if a particular selected network slice of block 460 does not meet one or more particular requested parameters, the cellular network provider may adjust the QoS parameters of the network slice such that the network slice does meet the requirements of the cellular network service request. Such an arrangement may be particularly acceptable when the adjustment to the network slice is to improve one or more QoS parameters, since an improvement (e.g., lowering jitter, increasing bandwidth) is unlikely to have a negative impact on any other clients using the same network slice.

Figure 5:
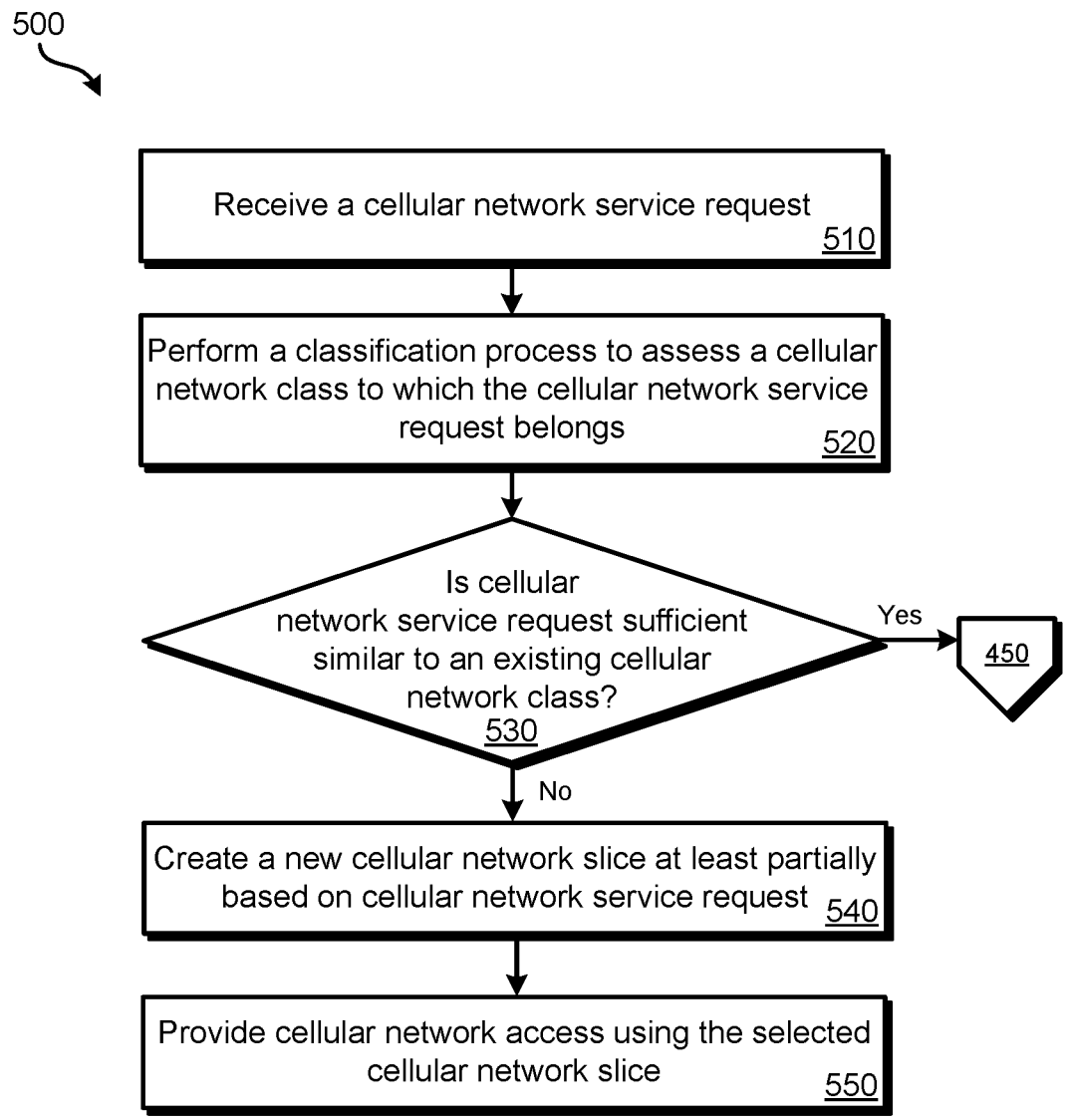
FIG. 5 illustrates an embodiment of a method for slice assignment.

In some embodiments, an existing cellular network class and/or slice may not be sufficiently similar to a network slice to use, either with or without modification. FIG. 5 illustrates an embodiment of a method 500 for network slice assignment that accounts for such a situation. Method 500 may be performed using system 100 of FIG. 1. More specifically, each block of method 500 can be performed using slice management system 160 of FIG. 2. Method 500 can also be performed using some other form of slice management system that may function as part of, or in communication with, a cellular network. The cellular network may be a 5G core network that allows for cellular network slicing. Other forms of cellular network that allow for cellular network slicing may also be possible. Prior to block 510, a multi-dimensional network slice attribute matrix may be created, and clustering may be performed as detailed in relation to blocks 410 and 410.

At block 510, a cellular network service request for a network slice may be received. The cellular network service request can indicate QoS levels or parameters that a client desires to be met for a specific group of UE, possibly in combination with the use of one or more particular applications. The cellular network service request may indicate some number of attributes, which may include a geographic indication, and a definition of the group of UE and/or the application for which the network slice is desired.

At block 520, a classification process may be performed to determine a cellular network class, previously created during an unsupervised machine learning clustering, that is a best match for the cellular network service request. A distance (e.g., Euclidian distance) between the attributes or parameters of the cellular network service request and each cellular network class may be calculated to determine which cellular network class is most similar to the parameters or attributes requested in the cellular network service request. If the cellular network classes were created using varying clustering parameters and/or varying machine learning algorithms, each of the created classes by the varying algorithms or varying cluster parameters may be evaluated to determine the closest slice class.

At block 530, a determination may be made as to whether the closest identified slice class is sufficiently close to justify analysis of individual network slices. For instance, a threshold distance may be compared to a distance determined between the parameters of the cellular network service request and the closest network slice class. If the threshold distance is greater than the difference, method 500 may proceed to block 450 (and the method may continue as detailed in relation to method 400). However, if the threshold distance is smaller than the difference, method 500 may proceed to block 540.

At block 540, a new network slice may be created that is at least partially based on the cellular network service request of block 510. In some embodiments, the parameters of the network slice may be set to exactly meet the requested parameters of the request. However, in other embodiments, the parameters of the slice may be varied, such as by improving one or more QoS parameters in order to increase the likelihood that some other client's future request may be met by the new network slice. As an example, the cellular network service request may have an unusually low requirement for downlink bandwidth to each UE. In order to improve the likelihood that some other client could also use this network slice, the downlink per UE parameter may be set higher than as requested by the request. Alternatively, the parameter of the network slice may be modified at a later time to accommodate another client.

At block 550, service may be provided to one or more UE of the client on the newly created network slice of block 540. Cellular network service may be provided on the selected network slice for all cellular network traffic for the UE or only for one or more specific applications.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for network slice assignment, the method comprising:
    accessing, by a network slice management system, a multi-dimensional attribute data storage arrangement that defines a plurality of network slices that operate on a cellular network, wherein
        for each network slice of the plurality of network slices, a plurality of network slice attributes is defined;
    creating, by the network slice management system, a plurality of cellular network classes;
    receiving, by the network slice management system, a cellular network service request for a client, wherein the cellular network service request defines a plurality of requested network slice attributes;
    performing, by the network slice management system, a classification process to determine a cellular network class of the plurality of cellular network classes that corresponds to the plurality of requested network slice attributes of the cellular network service request;
    performing, by the network slice management system, an analysis on network slices within only the determined cellular network class based on the classification process;
    selecting a network slice from the network slices of the cellular network class based on the analysis; and
    providing, by the cellular network, cellular network service to a plurality of user equipment of the client using the selected network slice on the cellular network.

2. The method of claim 1, wherein creating the plurality of cellular network classes comprises clustering the plurality of network slices that operate on the cellular network based on the plurality of network slice attributes to create the plurality of cellular network classes.

3. The method of claim 2, wherein the clustering is performed using a machine learning algorithm.

4. The method of claim 1, wherein the multi-dimensional attribute data storage arrangement is a multi-dimensional attribute matrix.

5. The method of claim 1, wherein the performed analysis is threshold-based to limit how different a parameter of a network slice within the determined cellular network class is permitted to be from the parameter of the plurality of requested network slice attributes.

6. The method of claim 5, wherein the request corresponds to an application of the client.

7. The method of claim 5, wherein the threshold-based analysis performed on the network slices within only the determined cellular network class comprises determining network slices that have at least a threshold difference between revenue and cost.

8. The method of claim 1, wherein performing the analysis comprises calculating a multi-dimensional distance between the cellular network service request and each of the plurality of cellular network classes.

9. The method of claim 1, wherein at least one parameter of the plurality of requested network slice attributes is selected from the group consisting of: downlink bandwidth per UE; uplink bandwidth per UE; and a defined latency range for an end-point.

10. The method of claim 1, further comprising:
filtering the determined cellular network class to include only network slices available in a geographic region indicated by the cellular network service request.

11. The method of claim 1, further comprising:
sorting network slices within the determined network class based on utilization.

12. The method for network slice assignment of claim 1, wherein the network slice management system manages network slices on a 5G New Radio (NR) cellular network.

13. A network slice management system, comprising:
a cellular network; and
a slice management system, comprising:
a multi-dimensional attribute data storage arrangement;
a slice class database;
one or more processors; and
a memory communicatively coupled with and readable by the one or more processors and having stored therein processor-readable instructions which, when executed by the one or more processors, cause the one or more processors to:
access the multi-dimensional attribute data storage arrangement that defines a plurality of network slices that operate on the cellular network, wherein
for each network slice of the plurality of network slices, a plurality of network slice attributes is defined;
create a plurality of cellular network classes;
receive a cellular network service request for a client, wherein the cellular network service request defines a plurality of requested network slice attributes;
perform a classification process to determine a cellular network class of the plurality of cellular network classes that corresponds to the plurality of requested network slice attributes of the cellular network service request;
perform an analysis on network slices within only the determined cellular network class based on the classification process; and
select a network slice from the network slices of the cellular network class based on the analysis, wherein:
the cellular network provides cellular network service to a plurality of user equipment of the client using the selected network slice.

14. The network slice management system of claim 13, wherein the one or more processors being configured to create the plurality of cellular network classes comprises the one or more processors being configured to cluster the plurality of network slices that operate on the cellular network based on the plurality of network slice attributes to create the plurality of cellular network classes.

15. The network slice management system of claim 14, wherein the clustering is performed by the one or more processors using a machine learning algorithm.

16. The network slice management system of claim 13, wherein the multi-dimensional attribute data storage arrangement is a multi-dimensional attribute matrix.

17. The network slice management system of claim 13, wherein the analysis performed by the one or more processors is threshold-based such that the analysis limits how different a parameter of a network slice within the determined cellular network class is permitted to be from the parameter of the plurality of requested network slice attributes.

18. The network slice management system of claim 17, wherein the threshold-based analysis performed by the one or more processors on the network slices within only the determined cellular network class comprises the one or more processors being configured to determine network slices that have at least a threshold difference between revenue and cost.

19. The network slice management system of claim 13, wherein the one or more processors being configured to perform the analysis comprises the one or more processors being configured to calculate a multi-dimensional distance between the cellular network service request and each of the plurality of cellular network classes.

20. The network slice management system of claim 13, wherein the cellular network is a 5G New Radio (NR) cellular network.

* * * * *